(12) United States Patent
Yanagisawa et al.

(10) Patent No.: US 8,710,145 B2
(45) Date of Patent: Apr. 29, 2014

(54) THERMOPLASTIC RESIN COMPOSITION

(75) Inventors: Tsunenori Yanagisawa, Tokyo (JP); Yukihiro Kiuchi, Tokyo (JP); Masatoshi Iji, Tokyo (JP)

(73) Assignee: NEC Corporation, Tokyo (JP)

( * ) Notice: Subject to any disclaimer, the term of this patent is extended or adjusted under 35 U.S.C. 154(b) by 947 days.

(21) Appl. No.: 11/922,041

(22) PCT Filed: Jun. 20, 2006

(86) PCT No.: PCT/JP2006/312320
§ 371 (c)(1),
(2), (4) Date: Dec. 12, 2007

(87) PCT Pub. No.: WO2006/137397
PCT Pub. Date: Dec. 28, 2006

(65) Prior Publication Data
US 2009/0286926 A1    Nov. 19, 2009

(30) Foreign Application Priority Data
Jun. 20, 2005    (JP) .................... 2005-179121

(51) Int. Cl.
| C08G 63/08 | (2006.01) |
| C08K 5/00 | (2006.01) |
| C08K 7/02 | (2006.01) |
| C08L 67/04 | (2006.01) |
| C08L 97/02 | (2006.01) |
| C08L 67/00 | (2006.01) |

(52) U.S. Cl.
USPC ............... 524/599; 524/9; 524/13; 524/14; 524/223; 525/437

(58) Field of Classification Search
USPC ............... 524/9, 13, 14, 223, 599; 525/437
See application file for complete search history.

(56) References Cited

U.S. PATENT DOCUMENTS

| 2002/0094444 A1 * | 7/2002 | Nakata et al. .............. 428/480 |
| 2004/0054051 A1 | 3/2004 | Ouchi et al. |

FOREIGN PATENT DOCUMENTS

| JP | 9-277991 | | 10/1997 | |
| JP | 9-278991 | | 10/1997 | |
| JP | 2003226801 A | * | 8/2003 | ............. C08L 67/04 |
| JP | 2004-51666 A | | 2/2004 | |
| JP | 2004-231910 | | 8/2004 | |
| JP | 2004-339454 | | 12/2004 | |
| JP | 2005-35134 | | 2/2005 | |
| JP | 2005-60691 | | 3/2005 | |
| JP | 2005060474 | * | 3/2005 | |
| JP | 2005-105245 | * | 4/2005 | |
| JP | 2005-105245 A | | 4/2005 | |
| JP | 2005105245 | * | 4/2005 | ............. C08L 67/04 |
| WO | 2004/063282 | | 7/2004 | |

OTHER PUBLICATIONS

Chinese Patent Office issued a Chinese Office Action dated Jan. 29, 2010, Application No. 200680022301.8.

* cited by examiner

*Primary Examiner* — David W Wu
*Assistant Examiner* — Marie Reddick
(74) *Attorney, Agent, or Firm* — Young & Thompson

(57) ABSTRACT

Provided is a plant-derived resin composite material which has a sufficiently fast crystallization rate and excellent moldability and heat resistance by using a thermoplastic resin composition containing a plant-derived thermoplastic resin and an organic crystal nucleating agent which is composed of one or more low molecular weight compounds comprising at least two polar groups in the molecule, a spacing between any two of the polar groups being 34±4 angstroms.

6 Claims, No Drawings

THERMOPLASTIC RESIN COMPOSITION

TECHNICAL FIELD

The present invention relates to a thermoplastic resin composition containing a plant-derived resin and which has excellent moldability and heat resistance.

BACKGROUND ART

Recently, plant-derived resins have been drawing attention as a replacement for petroleum raw materials, and practical applications of resin compositions utilizing various plant-derived resins are being actively investigated. One example of a resin composition utilizing a plant-derived resin that has recently been drawing particular attention is biodegradable resins such as polylactide, which are now being commercialized in various applications. The applications of biodegradable resins are extremely diverse, ranging from applications having a short usage period which presuppose being discarded, such as containers and packaging or films used in agriculture, to highly functional applications capable of maintaining initial characteristics over a long period of time, such as the housing of home electric appliances, office-automation equipment or parts used in automobiles.

Most plant-derived resins are crystalline resins, which means that it is important to crystallize the resin in order for it to express its inherent material characteristics such as heat resistance and the like. The crystallization rate for many plant-derived resins is slow, so to obtain a molding in which crystallization has finished, it is necessary to either hold the resin for a long time during the mold processing in a mold adjusted to the crystallization temperature of the resin, or to subject the molded article to an annealing treatment at the crystallization temperature after molding. However, holding the resin for a long time during the mold processing in a mold is not only impractical, the resultant molding also tends to be insufficiently crystallized. Further, crystallization by annealing after molding has the drawback that the molded article tends to change shape during the crystallization process.

Accordingly, various methods have been proposed to improve the crystallization rate of plant-derived resins to solve the above-described problems. For example, Patent Document 1 (Japanese Patent Laid-Open No. 9-278991) describes that a molding, which has both transparency and crystallinity, can be obtained by adding a transparent nucleating agent such as an aliphatic acid amide to an aliphatic polyester such as polylactide.

Patent Document 1: Japanese Patent Laid-Open No. 9-278991

DISCLOSURE OF THE INVENTION

Problems to be Solved by the Invention

However, if a transparent nucleating agent such as the aliphatic acid amide described in Patent Document 1 is added, although there is an improvement in crystallization rate compared with the case where no transparent nucleating agent is added, the effects of this improvement are insufficient. As a result, it is necessary to carry out a heat treatment after molding in order to obtain a molding which has a sufficient crystallinity degree. Further, because the crystallinity degree is low, crystal solidification in the mold during injection molding, for example, tends to be insufficient. This gives rise to the drawbacks that sufficient releasability cannot be obtained, and that the molding tends to change shape during mold release.

The present invention was made in view of the above-described problems in the related art, and it is an object of the present invention to provide a plant-derived resin composite material having a sufficiently fast crystallization rate and excellent moldability and heat resistance.

Means for Solving the Problems

As a result of extensive research into solving the above-described problems, the present inventors discovered that, among carboxylic acid amides and carboxylates, when a substance having polar groups on specific sites in the molecule is added as a crystal nucleating agent, the crystallization rate of a plant-derived resin dramatically improves as compared with when other carboxylic acid amides or carboxylates are added.

The present inventors also discovered that when fiber, such as kenaf fiber, is further added, moldability of the plant-derived resin improves compared with when only either the crystal nucleating agent or the fiber such as kenaf fiber is added, and further surprisingly, that heat resistance dramatically improves. As a result of these discoveries, the thermoplastic resin composition according to the present invention which has excellent moldability, as well as excellent heat resistance, was completed. Specifically, the present invention relates to the thermoplastic resin compositions specified in the following items (1) to (9).

(1) A thermoplastic resin composition comprising a plant-derived thermoplastic resin and an organic crystal nucleating agent which is composed of one or more low molecular weight compounds (excluding ethylenebis-12-hydroxystearic acid amide) comprising at least two polar groups in molecule, wherein a spacing between any two of the polar groups is 34±4 angstroms.

(2) The thermoplastic resin composition according to item (1), wherein the organic crystal nucleating agent is comprised of one or more low molecular weight compounds selected from carboxylic acid amides and carboxylates substituted with polar groups at said predetermined spacing.

(3) The thermoplastic resin composition according to item (1) or (2), wherein the polar groups are one or more of groups selected from an oxygen-containing substituent, a nitrogen-containing substituent and a halogen group.

(4) The thermoplastic resin composition according to any one of items (1) to (3), wherein the polar groups are one or more groups selected from a hydroxyl group, a glycidyl group, a carboxyl group, an amino group, a nitro group, a cyano group and an isocyanate group.

(5) The thermoplastic resin composition according to any one of items (1) to (4), characterized by further comprising 40% by weight or less of a fiber, as a percentage by weight based on the total weight of the thermoplastic resin composition.

(6) A thermoplastic resin composition comprising a plant-derived thermoplastic resin and an organic crystal nucleating agent which is composed of ethylenebis-12-hydroxystearic acid amide, characterized by further comprising 40% by weight or less of a fiber, as a percentage by weight based on the total weight of the thermoplastic resin composition.

(7) The thermoplastic resin composition according to item (5) or (6), wherein the fiber is one or more selected from plant-derived fiber, synthetic organic fiber and inorganic fiber.

(8) The thermoplastic resin composition according to any one of items (5) to (7), wherein the fiber has an average fiber length (number average fiber length excluding fragments) of 100 µm to 20 mm.

(9) The thermoplastic resin composition according to any one of items (5) to (8), wherein the fiber includes fiber having a length of 300 µm to 20 mm.

Effects of the Invention

In the present invention, because of the high chemical affinity between the plant-derived resin and each of the polar groups present on specific sites of a low molecular weight compound, such as a carboxylic acid amide and carboxylate, if the plant-derived resin present near such compound is cooled from a molten state, the resin turns into a crystal state as quickly as possible to form multiple crystal nuclei. As a result, a thermoplastic resin composition having excellent moldability can be obtained.

Further, it is thought that coexistence of the fiber such as kenaf fiber and the organic crystal nucleating agent of the present invention in the plant-derived resin, results in quick agglomeration of polylactide molecules around the fiber, whereby the advantageous effect of specifically promoted growth of the crystal phase, so-called transcrystal layer, can be obtained, which is a factor in achieving the beneficial effect of an improvement in the heat resistance of the composition. Therefore, as a result of the unexpected synergistic effects of the organic crystal nucleating agent of the present invention and fiber in promoting the formation of crystal nuclei and the formation of a transcrystal layer, a thermoplastic resin composition having excellent heat resistance and moldability can be realized.

As a result, the present invention can provide a plant-derived resin composite material having a sufficiently fast crystallization rate and excellent moldability. Further, if fiber is added, the present invention can provide a plant-derived resin composite material having a sufficiently fast crystallization rate and excellent moldability and heat resistance.

BEST MODE FOR CARRYING OUT THE INVENTION

Preferable exemplary embodiments of the present invention will now be described in more detail.

The thermoplastic resin composition according to the present invention comprises a plant-derived thermoplastic resin (hereinafter simply referred to as "plant-derived resin") and an organic crystal nucleating agent which is composed of one or more low molecular weight compounds such as a carboxylic acid amide and carboxylate having polar groups on specific sites in the molecule. In addition, the thermoplastic resin composition according to the present invention may comprise a plant-derived resin, an organic crystal nucleating agent which is composed of one or more low molecular weight compounds such as a carboxylic acid amide and carboxylate having polar groups on specific sites in the molecule, and fiber including kenaf fiber.

The plant-derived resin used in the present invention is not especially limited. Examples thereof may include polylactide or succinic acid obtained using the sugars contained in corn, potatoes and the like as a starting material. Examples of plant-derived resins based on succinic acid include esters such as polybutylene succinate. Further, polysaccharides such as starch, amylose, cellulose, cellulose ester, chitin, chitosan, gellan gum, carboxyl group-containing cellulose, carboxyl group-containing starch, pectinic acid and alginic acid are also plant-derived resins.

In addition, poly-beta-hydroxyalkanoate (trade name: Biopol, manufactured by Zeneca,) and the like, which is a polymer of hydroxybutyrate and/or hydroxyvalerate synthesized by a microorganism, may also be used since, although it is not plant-derived, it is the same as a plant-derived resin in that it does not require petroleum resources.

Among such plant-derived resins, artificially synthesized biodegradable oligomers and polymers, modified artificially synthesized biodegradable oligomers and polymers, and modified naturally synthesized biodegradable oligomers and polymers are preferable, as such resins have excellent thermoplasticity due to a suitable bonding force between molecules, do not dramatically increase in viscosity when molten, and have good molding processability. Among these resins, crystalline polyesters and modified polyesters are preferred, and aliphatic polyesters and modified aliphatic polyesters are even more preferred. Further, polyamino acids and modified polyamino acids are preferred, and aliphatic polyamino acids and modified aliphatic polyamino acids are even more preferred. In addition, polyols and modified polyols are preferred, and aliphatic polyols and modified aliphatic polyols are even more preferred.

A petroleum-derived resin may also be mixed into the plant-derived resin. Examples of such a mixture include an alloy containing, as the petroleum-derived resin, a thermosetting resin, such as polypropylene, polystyrene, ABS, nylons, polyethylene terephthalates, polybutylene terephthalates, polycarbonates, urea resins, melamine resins, alkyd resins, acrylic resins, unsaturated polyester resins, diallylphthalate resins, epoxy resins, silicone resins, cyanate resins, isocyanate resins, furan resins, ketone resins, xylene resins, thermosetting polyimides, thermosetting polyamides, styrylpyridine resins, nitrile terminated resins, addition-curable quinoxaline and addition-curable polyquinoxaline resins, and an above-described plant-derived resin. In the case of using a thermosetting resin, a curing agent or a curing accelerator necessary for the curing reaction may be used.

The low molecular weight compound acting as the organic crystal nucleating agent in the present invention has a molecular weight of not greater than 1,000, and preferably has a molecular weight between 100 and 900. If the molecular weight of the low molecular weight compound exceeds 1,000, its compatibility with the plant-derived resin decreases, whereby dispersibility may decrease and the compound may bleed out from the molding. Among such compounds, carboxylic acid amides and carboxylates are preferred, and may be used as a single compound or a mixture of two or more compounds.

Examples of the carboxylic acid amides include aliphatic monocarboxylic acid amides, aliphatic dicarboxylic acid amides and aromatic carboxylic acid amides. Examples of the carboxylates include aliphatic monocarboxylates, aliphatic dicarboxylates and aromatic carboxylates. These compounds may have one or more amide groups or ester groups. Among these, compounds containing an amide group are preferred, as they have a higher melting point than compounds containing an ester group, and can quickly form the crystal nuclei which are a factor in inducing crystallization of the plant-derived resin during molding of the thermoplastic resin composition in the present invention. In addition, bisamides are especially preferred, since they can improve the crystallization rate even more.

Specific examples of the aliphatic monocarboxylic acid amides, aliphatic dicarboxylic acid amides and aromatic carboxylic acid amides include lauric acid amide, palmitic acid amide, oleic acid amide, stearic acid amide, erucic acid amide, N-oleyl palmitic acid amide, N-oleyl oleic acid amide, N-oleyl stearic acid amide, N-stearyl oleic acid amide, N-stearyl stearic acid amide, N-stearyl erucic acid amide, methylene bisstearic acid amide, ethylene bislauric acid amide, ethylene biscapric acid amide, ethylene bisoleic acid amide, ethylene bisstearic acid amide, ethylene biserucic acid amide, ethylene bisisostearic acid amide, butylene bisstearic acid amide and p-xylylene bisstearic acid amide.

Specific examples of the aliphatic monocarboxylates, aliphatic dicarboxylates and aromatic carboxylates include laurate, palmitate, oleate, stearate, erucate, N-oleyl palmitate, N-oleyl oleate, N-oleyl stearate, N-stearyl oleate, N-stearyl stearate, N-stearyl erucate, methylene bisstearate, ethylene bislaurate, ethylene biscaprate, ethylene bisoleate, ethylene bisstearate, ethylene biserucate, ethylene bisisostearate, butylene bisstearate and p-xylylene bisstearate.

The polar groups in the low molecular weight compound according to the present invention may be any of an oxygen-containing substituent, a nitrogen-containing substituent or a halogen group. The low molecular weight compound according to the present invention has at least two of these polar groups, and the spacing between any two of the polar groups is preferably 34±4 angstroms. The expression "spacing between any two of the polar groups" refers to the straight-line distance between the carbon atoms to which the polar groups are bound in the state where the entire molecule is at its most extended, while each of the atoms constituting the entire molecule satisfies the known bond angles for the respective bonds. The number of polar groups on these compounds may be three or more. Specific examples of the type of polar group include, for an oxygen-containing substituent, a hydroxyl group, a glycidyl group, a carboxyl group and the like; and for a nitrogen-containing substituent, an amino group, a nitro group, a cyano group, an isocyanate group and the like. Further, different types of polar groups may be contained in a single molecule. However, cases where there are plural types of polar group in the molecule, and cases where the number of polar groups is three or more, may also function preferably when the spacing between two of the polar groups from among the above-described polar groups, is in the range of 34±4 angstroms in the state where the entire molecule is at its most extended, while each of the atoms constituting the entire molecule satisfies the known bond angles for the respective bonds, due to the influence from chemical interaction among the polar groups. The term "substituent" in the present invention means the substitution of a hydrogen atom bound to a carbon atom in a molecule which does not have a polar group.

The most specific feature of the present invention is the discovery that the spacing between poplar groups has a specific effect on crystallization of a plant-derived resin. Until now, it was completely unknown that an excellent crystallization rate could be achieved by specifying the spacing between polar groups.

Examples of carboxylic acid amides and carboxylates partially substituted in the molecule with polar groups which satisfy the above-described preferred conditions include ethylenebis-12-hydroxystearic acid amide, hexamethylenebis-10-hydroxystearic acid amide, hexamethylenebis-9,10-dihydroxystearic acid amide, p-xylylenebis-9,10-dihydroxystearic acid amide, p-xylylenebis-10,11-dihydroxystearic acid amide, ethylenebis-12-aminostearic acid amide, hexamethylenebis-10-aminostearic acid amide, hexamethylenebis-9,10-diaminostearic acid amide, p-xylylenebis-9,10-diaminostearic acid amide, p-xylylenebis-10,11-diaminostearic acid amide, ethylenebis-12-cyanostearic acid amide, hexamethylenebis-10-cyanostearic acid amide, hexamethylenebis-9,10-dicyanostearic acid amide, p-xylylenebis-9,10-dicyanostearic acid amide, p-xylylenebis-10,11-dicyanostearic acid amide, ethylenebis-12-glycidylstearic acid amide, hexamethylenebis-10-glycidylstearic acid amide, hexamethylenebis-9,10-diglycidylstearic acid amide, p-xylylenebis-9,10-diglycidylstearic acid amide, p-xylylenebis-10,11-diglycidylstearic acid amide, ethylenebis-12-hydroxystearate, hexamethylenebis-10-hydroxystearate, hexamethylenebis-9,10-dihydroxystearate, p-xylylenebis-9,10-dihydroxystearate, p-xylylenebis-10,11-dihydroxystearate, ethylenebis-12-aminostearate, hexamethylenebis-10-aminostearate, hexamethylenebis-9,10-diaminostearate, p-xylylenebis-9,10-diaminostearate, p-xylylenebis-10,11-diaminostearate, ethylenebis-12-cyanostearate, hexamethylenebis-10-cyanostearate, hexamethylenebis-9,10-dicyanostearate, p-xylylenebis-9,10-dicyanostearate, p-xylylenebis-10,11-dicyanostearate, ethylenebis-12-glycidylstearate, hexamethylenebis-10-glycidylstearate, hexamethylenebis-9,10-diglycidylstearate, p-xylylenebis-9,10-diglycidylstearate and p-xylylenebis-10,11-diglycidylstearate. Among these, carboxylic acid amides substituted with a hydroxyl group, namely, ethylenebis-12-hydroxystearic acid amide, hexamethylenebis-10-hydroxystearic acid amide, hexamethylenebis-9,10-dihydroxystearic acid amide and p-xylylenebis-10,11-dihydroxystearic acid amide are preferred, as these compounds are better at improving the crystallization rate of the plant-derived resin. Especially preferred are carboxylic acid bisamides having 2 to 8 methylene groups between the 2 amide bonds, or carboxylic acid bisamides containing 1 to 4 phenyl groups and which have 3 to 6 hydroxyl group substituents, i.e. hexamethylenebis-9,10-dihydroxystearic acid amide, p-xylylenebis-10,11-dihydroxystearic acid amide and p-xylylenebis-9,10-dihydroxystearic acid amide.

The melting points of the carboxylic acid amide and carboxylate partially substituted in the molecule with polar groups are preferably 20 to 300° C. If the melting point of the low molecular weight compound is less than 20° C., the compound tends to bleed out from the molding, which harms the appearance of the molding. On the other hand, if the melting point exceeds 300° C., it is difficult to melt the compound under normal molding process conditions, so that molding processability tends to decrease.

In the thermoplastic resin composition according to the present invention, the content of the organic crystal nucleating agent composed of a low molecular weight compound partially substituted in the molecule with polar groups is preferably 0.01 to 20% by weight based on 100% by weight of the plant-derived resin, and 0.1 to 10% by weight is more preferable. If the content of the organic crystal nucleating agent composed of a low molecular weight compound having polar groups is less than the above-described lower limit, the degree of improvement in rigidity and crystallization rate tends to be insufficient. On the other hand, if the content exceeds the above-described upper limit, the effect as a plasticizer is too strongly expressed, whereby the trend to a decrease in rigidity, bleed out from the molding and harm to the appearance of the molding can be dramatic.

The thermoplastic resin composition according to the present invention, by further comprising a fiber, can also provide higher heat resistance. In the case of using the fiber, the percentage by weight of the fiber based on the total weight of the thermoplastic resin composition according to the present invention is preferably 40% by weight or less, as shock resistance and moldability are especially good.

Examples of the fiber used in the present invention include plant fibers such as kenaf, synthetic organic fibers such as aramid fiber and wholly aromatic polyester fiber and inorganic fibers such as glass fiber and metal fiber. These may be used singly or with two or more of them mixed together. Further, different types of fiber may be mixed together and used.

The term "plant fiber" in the present invention refers to fiber which is derived from plants. Specific examples thereof include fibers obtained from wood, kenaf, bamboo, hemp and the like. These fibers preferably have an average fiber length of not greater than 20 mm. Further, pulp or the like obtained by subjecting such plant fibers to delignification and depectinization is especially preferable, since such pulp is not broken down much by heat and shows little deterioration such as discoloration. Since kenaf and bamboo grow quickly due to their high rate of photosynthesis, they can absorb a large amount of carbon dioxide. Accordingly, among plant fibers, kenaf and bamboo are preferred, as they are excellent as one means of simultaneously resolving the environmental problems of global warming caused by carbon dioxide as well as deforestation.

Examples of synthetic organic fibers in the present invention include polyamide fiber such as aramid fiber and nylon fiber, polyester fiber such as polyallylate fiber and polyethylene terephthalate fiber, ultra-high strength polyethylene fiber, polypropylene fiber and the like.

Aramid fiber and polyallylate fiber, which are aromatic compounds, are particularly desirable from the viewpoint that they have higher heat resistance and higher strength, and are paler than other fibers, and thus do not damage design properties when added to the resin and have low specific gravity.

Examples of the inorganic fibers in the present invention include carbon fiber, metal fiber, glass fiber, metal silicates, inorganic oxide fiber, inorganic nitride fiber and the like.

As for the shape of the above-described fibers, the fiber cross-section is preferably polygonal, irregular or a hubbly shape, not circular, as fibers having a high aspect ratio or a small fiber diameter have a greater contact area with the resin.

Further, the above-described fibers may optionally be subjected to a surface treatment in order to increase compatibility with the resin which is base material or to enhance entanglement between the fibers. Effective surface treatments include treatment by a silane or titanate coupling agent, ozone or plasma treatment, as well as treatment by an alkyl phosphate surfactant. However, the method is not limited to these, and methods generally used for surface modification of fillers may be used.

The above-described fibers preferably have an average fiber length (number average fiber length excluding fragments) of 100 μm to 20 mm. A range of 0.1 mm or more to 10 mm or less is especially effective. It is also preferred to include fibers having a length of 300 μm to 20 mm.

The thermoplastic resin composition according to the present invention may also be optionally used with an inorganic filler, a reinforcement material, a colorant (titanium oxide etc.), a stabilizer (such as a radical scavenger and an antioxidant), a flame retardant (such as known metal hydrates, halogen flame retardants and phosphorous flame retardants), known crystal nucleating agents (talc etc.), an antibacterial agent, an antifungal agent and the like. Examples of the inorganic filler which can be used include silica, alumina, smash clay, slag and the like. Needle-shaped inorganic matter can be used as the reinforcing agent. As the antibacterial agent, silver ions, copper ions, zeolite containing such ions and the like can be used.

The above-described thermoplastic resin composition according to the present invention can be processed into a molding for electrical and electronic equipment applications such as the casing for electric appliances, building material applications, automobile part applications, daily-necessity applications, medical applications, agricultural applications and the like, by methods such as injection molding, film molding, blow molding and foam molding.

The method for mixing the various blended components of the thermoplastic resin composition according to the present invention is not particularly limited. Examples include mixing using a known mixer, such as a tumbler, a ribbon blender or a single- or twin-screw kneader, and melt-mixing using an extruder or a roll.

The method for molding the thermoplastic resin composition according to the present invention is not particularly limited, and usual molding methods for producing electrical and electronic equipment products, such as known injection molding, injection/compression molding and compression molding may be used. The temperature during the melt-mixing and molding can be set in a range which is equal to or higher than the melting temperature of the resin which acts as a base material and in which the plant fiber and plant-derived resin do not deteriorate due to the heat.

EXAMPLES

The present invention will now be described in more detail with reference to the following specific examples.

First, the raw materials used in examples of the present invention, comparative examples and reference examples will be described. As the plant-derived resin, polylactide resin (product name: "TE-4000"; manufactured by Unitika Ltd.) was used. Used as the carboxylic acid amide for the organic crystal nucleating agent were ethylenebis-12-hydroxystearic acid amide, hexamethylenebis-9,10-dihydroxystearic acid amide, p-xylylenebis-9,10-dihydroxystearic acid amide, hexamethylenebis-12-hydroxystearic acid amide and ethylenebis-9,10-dihydroxystearic acid amide. Bast-derived fiber having an average fiber length of 5 mm was used for the kenaf fiber, and fiber (manufactured by Asahi Fiber Glass Co., Ltd.) having a fiber diameter of 10 μm and average fiber length of 5 mm was used for the glass fiber. As the inorganic filler, 50% by weight aluminum hydroxide (containing 0.05% by weight of sodium oxide) having a grain size of 4 μm was used.

Next, the methods for evaluating moldability and heat resistance in examples of the present invention and comparative examples will be described.

(1) Kneading of the Resin Composition

The respective materials for the thermoplastic resin compositions described in the following examples and comparative examples were melt-mixed by a kneader (using a twin-shaft type) set so that the temperature of the composition would be about 190° C. to produce a pellet for injection molding.

(2) Production of the Evaluation Samples

Using a pellet which had been dried at 100° C. for 7 hours or more, moldings having a sheet thickness of 3.2 mm (130 mm length, 12 mm width) were produced by an injection molder with a mold surface temperature set at 110° C. to obtain the sample used in the various evaluations. It is noted that the temperature of the barrel and of the nozzle in the injection molder were set at 190° C. or 200° C.

(3) Evaluation of Injection Moldability

The holding time (cooling time) that was required inside the mold for each of the samples molded in (2) in order to extract a specimen which had good moldability and releasability, had sufficient crystal solidification of the molding and was free from warpage and shrinkage, was measured to obtain a moldability index.

(4) Evaluation of Heat Resistance

The deflection temperature under load (Heat Deflection Temperature: HDT) was measured according to JIS K 7191-2 for each of the samples molded in (2). The measuring conditions were a load of 1.8 MPa, rate of temperature increase of 2° C./min and a distance between supporting points of 100 mm. HDT was used as an index of heat resistance.

(5) Measurement of Crystallization Rate by DSC

Specimens of 5 to 10 mg were collected from the above-described pellet and sandwiched between pans made from aluminum. Using a differential thermal analyzer (product name: "EXSTAR 6200", manufactured by Seiko Instruments Inc.), the crystallization rate was evaluated. It is note that these measurements were performed under a decreasing temperature mode at a constant speed. Specifically, the temperature was decreased at a constant rate from a temperature where the samples were in a melted state to a given temperature (in the present example, 20° C.). The temperature at which an endothermic peak resulting from crystallization appeared was measured to obtain a crystallization rate index. Specifically, a thermoplastic resin composition, in which such a temperature is high, here will more easily crystallize at even higher temperatures, and can be said to be a composition having a high crystallization rate. The measurement was performed under a nitrogen atmosphere. During measurement, the temperature was varied in order of the following steps 1 to 3.

Step 1: Temperature increased from 20° C. to 200° C. at a rate of temperature increase of 30° C./min Step 2: Temperature held for 5 minutes at 200° C.

Step 3: Temperature decreased from 200° C. to 20° C. at a rate of temperature decrease of 5° C./min (6) Analysis of the Spacing Between Polar Groups Analysis of the spacing of the polar groups in the low molecular weight compound partially substituted in the molecule with polar groups was carried out by molecular modeling. Using the molecular modeling software program Chem 3D (product name) made by CambridgeSoft Corporation, the spacing between the carbon atoms to which the polar groups are bound in the state where the entire molecule is at its most extended, while each of the atoms constituting the entire molecule satisfies the known bond angles for the respective bonds, was measured.

Reference Example 1

A resin composition mixing 97.5% by weight of polylactide resin as the plant-derived resin with 2.5% by weight of ethylenebis-12-hydroxystearic acid amide as the organic crystal nucleating agent was melt-mixed by a kneader to produce a pellet. The temperature of the kneader was set so that the temperature of the resin composition would be about 190° C.

Next, the obtained pellet was dried at 100° C. for 7 hours or more, and then molded into an evaluation sample using an injection molder with a barrel temperature set at 190° C. The results obtained according to the above evaluation method are shown in Table 1.

(Examples 1-46), (Comparative Examples 1-22), (Reference Examples 2-8)

Various evaluation samples were produced in the same manner as in Reference Example 1, except that the resin compositions blended as shown in Tables 1 to 17 were used.

[Table 1]

TABLE 1

|  | Ref. Ex. 1 | Ex. 1 | Ex. 2 | Ref. Ex. 2 | Com. Ex. 1 | Com. Ex. 2 |
|---|---|---|---|---|---|---|
| Polylactide (wt %) | 97.5 | 97.5 | 97.5 | 97.5 | 97.5 | 100 |
| Carboxylic Acid Amide | A | B | C | D | E | — |
| Added Amount (wt %) | 2.5 | 2.5 | 2.5 | 2.5 | 2.5 |  |
| Spacing between Polar groups (Å) | 33.9 | 33.8 | 32.1 | 38.9 | 28.8 | — |
| Molding Cooling Time (s) | 40 | 35 | 60 | 90 | >150 | Molding not possible |

[Table 2]

TABLE 2

|  | Ex. 3 | Com. Ex. 2 | Ref. Ex. 3 | Com. Ex. 3 |
|---|---|---|---|---|
| Polylactide (wt %) | 75 | 100 | 95 | 80 |
| Carboxylic Acid Amide | A | — | A | — |
| Added Amount (wt %) | 5 |  | 5 |  |
| Fiber (average fiber length 5 mm) | Kenaf |  |  | Kenaf |
| Added Amount (wt %) | 20 |  |  | 20 |
| DSC Carboxylic Acid Amide Crystallization Temperature (° C.) | 132 | — | 130 | — |
| Polylactide Crystallization Temperature (° C.) | 120 | Peak detection not possible | 118 | 105 |
| Molding Cooling Time (s) | 35 | Molding not possible | 40 | >150 |
| 1.8 MPa Thermal Deformation Temperature (° C.) | 135 | 66* | 66 | 112 |

*Used a sample obtained by molding with a low-temperature mold (surface temperature 25° C.), and then crystallizing by an annealing treatment for 4 hours at 100° C.

In Tables 1 to 17, the carboxylic acid amide A to E were the following compounds.
A: Ethylenebis-12-hydroxystearic acid amide
B: Hexamethylenebis-9,10-dihydroxystearic acid amide
C: p-Xylylenebis-9,10-dihydroxystearic acid amide
D: Hexamethylenebis-12-hydroxystearic acid amide
E: Ethylenebis-9,10-dihydroxystearic acid amide

[Table 3]

TABLE 3

|  | Ex. 4 | Com. Ex. 2 | Ex. 5 | Com. Ex. 3 |
|---|---|---|---|---|
| Polylactide (wt %) | 75 | 100 | 95 | 80 |
| Carboxylic Acid Amide | B | — | B | — |
| Added Amount (wt %) | 5 |  | 5 |  |
| Fiber (average fiber length 5 mm) | Kenaf | — | — | Kenaf |
| Added Amount (wt %) | 20 |  |  | 20 |
| DSC Carboxylic Acid Amide Crystallization Temperature (° C.) | 160 | — | 160 | — |

TABLE 3-continued

|  |  | Ex. 4 | Com. Ex. 2 | Ex. 5 | Com. Ex. 3 |
|---|---|---|---|---|---|
|  | Polylactide Crystallization Temperature (° C.) | 124 | Peak detection not possible | 124 | 105 |
| Molding | Cooling Time (s) | 30 | Molding not possible | 35 | >150 |
| 1.8 MPa Thermal Deformation Temperature (° C.) |  | 130 | 66* | 66 | 112 |

*Used a sample obtained by molding with a low-temperature mold (surface temperature 25° C.), and then crystallizing by an annealing treatment for 4 hours at 100° C.

[Table 4]

TABLE 4

|  | Ref. Ex. 4 | Ref. Ex. 5 | Ref. Ex. 1 | Ref. Ex. 6 | Ref. Ex. 7 | Ref. Ex. 8 | Com. Ex. 2 |
|---|---|---|---|---|---|---|---|
| Polylactide (wt %) | 99.5 | 99 | 97.5 | 95 | 90 | 85 | 100 |
| Carboxylic Acid Amide | A | A | A | A | A | A | — |
| Added Amount (wt %) | 0.5 | 1 | 2.5 | 5 | 10 | 15 |  |
| Molding Cooling Time (s) | 60 | 45 | 40 | 40 | 40 | 40 | Molding not possible |

[Table 5]

TABLE 5

|  | Ex. 6 | Ex. 7 | Ex. 8 | Ex. 5 | Ex. 9 | Ex. 10 | Com. Ex. 2 |
|---|---|---|---|---|---|---|---|
| Polylactide (wt %) | 99.5 | 99 | 97.5 | 95 | 90 | 85 | 100 |
| Carboxylic Acid Amide | B | B | B | B | B | B | — |
| Added Amount (wt %) | 0.5 | 1 | 2.5 | 5 | 10 | 15 |  |
| Molding Cooling Time (s) | 55 | 40 | 35 | 35 | 35 | 35 | Molding not possible |

[Table 6]

TABLE 6

|  |  | Com. Ex. 3 | Ex. 11 | Ex. 12 | Ex. 13 | Ex. 3 | Com. Ex. 2 | Ref. Ex. 3 |
|---|---|---|---|---|---|---|---|---|
| Polylactide (wt %) |  | 80 | 79.5 | 79 | 77.5 | 75 | 100 | 95 |
| Carboxylic Acid Amide |  | — | A | A | A | A | — | A |
| Added Amount (wt %) |  | — | 0.5 | 1 | 2.5 | 5 | — | 5 |
| Fiber (average fiber length 5 mm) |  | Kenaf | Kenaf | Kenaf | Kenaf | Kenaf | — | — |
| Added Amount (wt %) |  | 20 | 20 | 20 | 20 | 20 | — | — |
| DSC | Carboxylic Acid Amide Crystallization Temperature (° C.) | — | 130 | 132 | 132 | 132 | — | 130 |
|  | Polylactide Crystallization Temperature (° C.) | 105 | 118 | 120 | 120 | 120 | Peak detection not possible | 118 |
| Molding | Cooling Time (s) | >150 | 55 | 40 | 35 | 35 | Molding not possible | 40 |
| 1.8 MPa Thermal Deformation Temperature (° C.) |  | 112 | 126 | 135 | 134 | 135 | 66* | 66 |

*Used a sample obtained by molding with a low-temperature mold (surface temperature 25° C.), and then crystallizing by an annealing treatment for 4 hours at 100° C.

[Table 7]

TABLE 7

|  |  | Com. Ex. 3 | Ex. 14 | Ex. 15 | Ex. 16 | Ex. 17 | Com. Ex. 2 | Ex. 5 |
|---|---|---|---|---|---|---|---|---|
| Polylactide (wt %) |  | 80 | 79.5 | 79 | 77.5 | 75 | 100 | 95 |
| Carboxylic Acid Amide |  | — | B | B | B | B | — | B |
| Added Amount (wt %) |  | — | 0.5 | 1 | 2.5 | 5 | — | 5 |
| Fiber (average fiber length 5 mm) |  | Kenaf | Kenaf | Kenaf | Kenaf | Kenaf | — | — |
| Added Amount (wt %) |  | 20 | 20 | 20 | 20 | 20 | — | — |
| DSC | Carboxylic Acid Amide Crystallization Temperature (° C.) | — | 158 | 160 | 160 | 160 | — | 160 |
|  | Polylactide | 105 | 120 | 122 | 124 | 124 | Peak detection | 124 |

TABLE 7-continued

|  |  | Com. Ex. 3 | Ex. 14 | Ex. 15 | Ex. 16 | Ex. 17 | Com. Ex. 2 | Ex. 5 |
|---|---|---|---|---|---|---|---|---|
|  | Crystallization Temperature (° C.) |  |  |  |  |  | not possible |  |
| Molding | Cooling Time (s) | >150 | 50 | 35 | 30 | 30 | Molding not possible | 35 |
| 1.8 MPa Thermal Deformation Temperature (° C.) |  | 112 | 120 | 125 | 129 | 130 | 66* | 66 |

*Used a sample obtained by molding with a low-temperature mold (surface temperature 25° C.), and then crystallizing by an annealing treatment for 4 hours at 100° C.

[Table 8]

TABLE 8

|  |  | Com. Ex. 3 | Ex. 18 | Ex. 19 | Ex. 20 | Ex. 21 | Com. Ex. 2 | Ex. 22 |
|---|---|---|---|---|---|---|---|---|
| Polylactide (wt %) |  | 80 | 79.5 | 79 | 77.5 | 75 | 100 | 95 |
| Carboxylic Acid Amide |  | — | C | C | C | C | — | C |
| Added Amount (wt %) |  |  | 0.5 | 1 | 2.5 | 5 |  | 5 |
| Fiber (average fiber length 5 mm) |  | Kenaf | Kenaf | Kenaf | Kenaf | Kenaf | — | — |
| Added Amount (wt %) |  | 20 | 20 | 20 | 20 | 20 |  |  |
| DSC | Carboxylic Acid Amide Crystallization Temperature (° C.) | — | 162 | 165 | 165 | 165 | — | 165 |
|  | Polylactide Crystallization Temperature (° C.) | 105 | 108 | 110 | 115 | 115 | Peak detection not possible | 116 |
| Molding | Cooling Time (s) | >150 | 70 | 60 | 55 | 55 | Molding not possible | 60 |
| 1.8 MPa Thermal Deformation Temperature (° C.) |  | 112 | 118 | 120 | 124 | 126 | 66* | 66 |

*Used a sample obtained by molding with a low-temperature mold (surface temperature 25° C.), and then crystallizing by an annealing treatment for 4 hours at 100° C.

[Table 9]

TABLE 9

|  |  | Com. Ex. 2 | Com. Ex. 4 | Com. Ex. 5 | Com. Ex. 6 | Com. Ex. 7 | Com. Ex. 3 | Com. Ex. 8 |
|---|---|---|---|---|---|---|---|---|
| Polylactide (wt %) |  | 100 | 99 | 97 | 95 | 90 | 80 | 70 |
| Fiber (average fiber length 5 mm) |  | — | Kenaf | Kenaf | Kenaf | Kenaf | Kenaf | Kenaf |
| Added Amount (wt %) |  |  | 1 | 3 | 5 | 10 | 20 | 30 |
| DSC | Carboxylic Acid Amide Crystallization Temperature (° C.) | — | — | — | — | — | — | — |
|  | Polylactide Crystallization Temperature (° C.) | Peak detection not possible | 98 | 99 | 100 | 103 | 105 | 106 |
| Molding | Cooling Time (s) | Molding not possible | >150 | >150 | >150 | >150 | >150 | >150 |
| 1.8 MPa Thermal Deformation Temperature (° C.) |  | 66* | 66 | 67 | 68 | 76 | 112 | 137 |

*Used a sample obtained by molding with a low-temperature mold (surface temperature 25° C.), and then crystallizing by an annealing treatment for 4 hours at 100° C.

[Table 10]

TABLE 10

|  |  | Com. Ex. 2 | Ref. Ex. 5 | Ex. 23 | Ex. 24 | Ex. 25 | Ex. 26 | Ex. 12 | Ex. 27 |
|---|---|---|---|---|---|---|---|---|---|
| Polylactide (wt %) |  | 100 | 99 | 98 | 96 | 94 | 89 | 79 | 69 |
| Carboxylic Acid Amide |  | — | A | A | A | A | A | A | A |
| Added Amount (wt %) |  |  | 1 | 1 | 1 | 1 | 1 | 1 | 1 |
| Fiber (average fiber length 5 mm) |  | — | — | Kenaf | Kenaf | Kenaf | Kenaf | Kenaf | Kenaf |
| Added Amount (wt %) |  |  |  | 1 | 3 | 5 | 10 | 20 | 30 |
| DSC | Carboxylic Acid Amide Crystallization Temperature (° C.) | — | 130 | 130 | 130 | 130 | 130 | 132 | 132 |
|  | Polylactide Crystallization Temperature (° C.) | Peak detection not possible | 117 | 117 | 117 | 117 | 119 | 120 | 121 |
| Molding | Cooling Time (s) | Molding not possible | 45 | 40 | 40 | 40 | 40 | 40 | 40 |

TABLE 10-continued

|  | Com. Ex. 2 | Ref. Ex. 5 | Ex. 23 | Ex. 24 | Ex. 25 | Ex. 26 | Ex. 12 | Ex. 27 |
|---|---|---|---|---|---|---|---|---|
| 1.8 MPa Thermal Deformation Temperature (° C.) | 66* | 66 | 66 | 69 | 71 | 83 | 135 | 165 |

*Used a sample obtained by molding with a low-temperature mold (surface temperature 25° C.), and then crystallizing by an annealing treatment for 4 hours at 100° C.

[Table 11]

TABLE 11

|  |  | Com. Ex. 2 | Ex. 7 | Ex. 28 | Ex. 29 | Ex. 30 | Ex. 31 | Ex. 15 | Ex. 32 |
|---|---|---|---|---|---|---|---|---|---|
| Polylactide (wt %) |  | 100 | 99 | 98 | 96 | 94 | 89 | 79 | 69 |
| Carboxylic Acid Amide |  | — | B | B | B | B | B | B | B |
| Added Amount (wt %) |  |  | 1 | 1 | 1 | 1 | 1 | 1 | 1 |
| Fiber (average fiber length 5 mm) |  | — | — | Kenaf | Kenaf | Kenaf | Kenaf | Kenaf | Kenaf |
| Added Amount (wt %) |  |  |  | 1 | 3 | 5 | 10 | 20 | 30 |
| DSC | Carboxylic Acid Amide Crystallization Temperature (° C.) | — | 160 | 160 | 160 | 160 | 161 | 160 | 160 |
|  | Polylactide Crystallization Temperature (° C.) | Peak detection not possible | 120 | 120 | 120 | 120 | 120 | 122 | 122 |
| Molding | Cooling Time (s) | Molding not possible | 40 | 35 | 35 | 35 | 35 | 35 | 35 |
| 1.8 MPa Thermal Deformation Temperature (° C.) |  | 66* | 66 | 66 | 68 | 70 | 80 | 125 | 151 |

*Used a sample obtained by molding with a low-temperature mold (surface temperature 25° C.), and then crystallizing by an annealing treatment for 4 hours at 100° C.

[Table 12]

TABLE 12

|  |  | Com. Ex. 2 | Com. Ex. 9 | Com. Ex. 10 | Com. Ex. 11 | Com. Ex. 12 | Com. Ex. 13 |
|---|---|---|---|---|---|---|---|
| Polylactide (wt %) |  | 100 | 99 | 97 | 95 | 90 | 80 |
| Carboxylic Acid Amide |  | — | — | — | — | — | — |
| Added Amount (wt %) |  |  |  |  |  |  |  |
| Fiber (average fiber length 5 mm) |  | — | Glass | Glass | Glass | Glass | Glass |
| Added Amount (wt %) |  |  | 1 | 3 | 5 | 10 | 20 |
| DSC | Carboxylic Acid Amide Crystallization Temperature (° C.) | — | — | — | — | — | — |
|  | Polylactide Crystallization Temperature (° C.) | Peak detection not possible | Peak detection not possible | Peak detection not possible | Peak detection not possible | Peak detection not possible | Peak detection not possible |
| Molding | Cooling Time (s) | Molding not possible | Molding not possible | Molding not possible | Molding not possible | Molding not possible | Molding not possible |
| 1.8 MPa Thermal Deformation Temperature (° C.) |  | 66* | 68* | 73* | 68* | 98* | 140* |

*Used a sample obtained by molding with a low-temperature mold (surface temperature 25° C.), and then crystallizing by an annealing treatment for 4 hours at 100° C.

[Table 13]

TABLE 13

|  |  | Com. Ex. 2 | Ref. Ex. 5 | Ex. 33 | Ex. 34 | Ex. 35 | Ex. 36 | Ex. 37 |
|---|---|---|---|---|---|---|---|---|
| Polylactide (wt %) |  | 100 | 99 | 98 | 96 | 94 | 89 | 79 |
| Carboxylic Acid Amide |  | — | A | A | A | A | A | A |
| Added Amount (wt %) |  |  | 1 | 1 | 1 | 1 | 1 | 1 |
| Fiber (average fiber length 5 mm) |  | — | — | Glass | Glass | Glass | Glass | Glass |
| Added Amount (wt %) |  |  |  | 1 | 3 | 5 | 10 | 20 |
| DSC | Carboxylic Acid Amide Crystallization Temperature (° C.) | — | 130 | 130 | 130 | 130 | 130 | 130 |
|  | Polylactide Crystallization Temperature (° C.) | Peak detection not possible | 117 | 117 | 117 | 117 | 117 | 117 |
| Molding | Cooling Time (s) | Molding not possible | 45 | 40 | 40 | 40 | 40 | 40 |

TABLE 13-continued

|  | Com. Ex. 2 | Ref. Ex. 5 | Ex. 33 | Ex. 34 | Ex. 35 | Ex. 36 | Ex. 37 |
|---|---|---|---|---|---|---|---|
| 1.8 MPa Thermal Deformation Temperature (° C.) | 66* | 66 | 69 | 78 | 87 | 110 | 157 |

*Used a sample obtained by molding with a low-temperature mold (surface temperature 25° C.), and then crystallizing by an annealing treatment for 4 hours at 100° C.

[Table 14]

TABLE 14

|  |  | Com. Ex. 14 | Com. Ex. 15 | Com. Ex. 16 | Com. Ex. 17 | Com. Ex. 18 |
|---|---|---|---|---|---|---|
| Polylactide (wt %) |  | 55 | 54 | 52 | 50 | 45 |
| Carboxylic Acid Amide Added Amount (wt %) |  | — | — | — | — | — |
| Aluminum Hydroxide (wt %) |  | 45 | 45 | 45 | 45 | 45 |
| Fiber (average fiber length 5 mm) |  | — | Kenaf | Kenaf | Kenaf | Kenaf |
| Added Amount (wt %) |  |  | 1 | 3 | 5 | 10 |
| DSC | Carboxylic Acid Amide Crystallization Temperature (° C.) | — | — | — | — | — |
|  | Polylactide Crystallization Temperature (° C.) | Peak detection not possible | 98 | 99 | 100 | 103 |
| Molding | Cooling Time (s) | Molding not possible | >150 | >150 | >150 | >150 |
| 1.8 MPa Thermal Deformation Temperature (° C.) |  | 90* | 93 | 100 | 108 | 120 |

*Used a sample obtained by molding with a low-temperature mold (surface temperature 25° C.), and then crystallizing by an annealing treatment for 4 hours at 100° C.

[Table 15]

TABLE 15

|  |  | Com. Ex. 14 | Ex. 38 | Ex. 39 | Ex. 40 | Ex. 41 | Ex. 42 |
|---|---|---|---|---|---|---|---|
| Polylactide (wt %) |  | 55 | 54 | 53 | 51 | 49 | 44 |
| Carboxylic Acid Amide |  | — | A | A | A | A | A |
| Added Amount (wt %) |  |  | 1 | 1 | 1 | 1 | 1 |
| Aluminum Hydroxide (wt %) |  | 45 | 45 | 45 | 45 | 45 | 45 |
| Fiber (average fiber length 5 mm) |  | — | — | Kenaf | Kenaf | Kenaf | Kenaf |
| Added Amount (wt %) |  |  |  | 1 | 3 | 5 | 10 |
| DSC | Carboxylic Acid Amide Crystallization Temperature (° C.) |  | 130 | 130 | 130 | 130 | 130 |
|  | Polylactide Crystallization Temperature (° C.) | Peak detection not possible | 117 | 117 | 117 | 117 | 119 |
| Molding | Cooling Time (s) | Molding not possible | 45 | 40 | 40 | 40 | 40 |
| 1.8 MPa Thermal Deformation Temperature (° C.) |  | 90* | 89 | 96 | 106 | 114 | 130 |

*Used a sample obtained by molding with a low-temperature mold (surface temperature 25° C.), and then crystallizing by an annealing treatment for 4 hours at 100° C.

[Table 16]

TABLE 16

|  |  | Com. Ex. 14 | Com. Ex. 19 | Com. Ex. 20 | Com. Ex. 21 | Com. Ex. 22 |
|---|---|---|---|---|---|---|
| Polylactide (wt %) |  | 55 | 54 | 52 | 50 | 45 |
| Carboxylic Acid Amide Added Amount (wt %) |  | — | — | — | — | — |
| Aluminum Hydroxide (wt %) |  | 45 | 45 | 45 | 45 | 45 |
| Fiber (average fiber length 5 mm) |  | — | Glass | Glass | Glass | Glass |
| Added Amount (wt %) |  |  | 1 | 3 | 5 | 10 |
| DSC | Carboxylic Acid Amide Crystallization Temperature (° C.) | — | — | — | — | — |
|  | Polylactide Crystallization Temperature (° C.) | Peak detection not possible | Peak detection not possible | Peak detection not possible | Peak detection not possible | Peak detection not possible |
| Molding | Cooling Time (s) | Molding not possible | Molding not possible | Molding not possible | Molding not possible | Molding not possible |

TABLE 16-continued

|  | Com. Ex. 14 | Com. Ex. 19 | Com. Ex. 20 | Com. Ex. 21 | Com. Ex. 22 |
|---|---|---|---|---|---|
| 1.8 MPa Thermal Deformation Temperature (° C.) | 90* | 95* | 105* | 115* | 130* |

*Used a sample obtained by molding with a low-temperature mold (surface temperature 25° C.), and then crystallizing by an annealing treatment for 4 hours at 100° C.

[Table 17]

TABLE 17

|  |  | Com. Ex. 14 | Ex. 38 | Ex. 43 | Ex. 44 | Ex. 45 | Ex. 46 |
|---|---|---|---|---|---|---|---|
| Polylactide (wt %) |  | 55 | 54 | 53 | 51 | 49 | 44 |
| Carboxylic Acid Amide |  | — | A | A | A | A | A |
| Added Amount (wt %) |  |  | 1 | 1 | 1 | 1 | 1 |
| Aluminum Hydroxide (wt %) |  | 45 | 45 | 45 | 45 | 45 | 45 |
| Fiber (average fiber length 5 mm) |  | — | — | Glass | Glass | Glass | Glass |
| Added Amount (wt %) |  |  |  | 1 | 3 | 5 | 10 |
| DSC | Carboxylic Acid Amide Crystallization Temperature (° C.) | — | 130 | 130 | 130 | 130 | 130 |
|  | Polylactide Crystallization Temperature (° C.) | Peak detection not possible | 117 | 117 | 117 | 117 | 117 |
| Molding | Cooling Time (s) | Molding not possible | 45 | 40 | 40 | 40 | 40 |
| 1.8 MPa Thermal Deformation Temperature (° C.) |  | 90* | 89 | 97 | 109 | 119 | 135 |

*Used a sample obtained by molding with a low-temperature mold (surface temperature 25° C.), and then crystallizing by an annealing treatment for 4 hours at 100° C.

It can be seen from the results shown in Tables 1, 4 and 5 that the thermoplastic resin composition according to the present invention has better moldability than the resin compositions of the respective comparative examples according to the related art.

It is clear from a comparison of Example 3 with Reference Example 3 and Comparative Example 3 shown in Table 2, and a comparison of Examples 4 and 5 with Comparative Example 3 shown in Table 4, that the heat resistance of a resin composition dramatically improves if fiber and a low molecular weight compound partially substituted in the molecule with polar groups are simultaneously added to the plant-derived resin (Examples 3 and 4) compared with when fiber is added alone (Comparative Example 3). In addition, the moldability of the resin composition dramatically improves (Examples 3 and 4) compared with when a low molecular weight compound partially substituted in the molecule with polar groups is added alone (Reference Example 3 and Example 5).

As shown in Examples 1, 5 and 11 to 22, Comparative Examples 2 and 3 and Reference Example 3 shown in Tables 6 to 8, the heat resistance of a resin composition dramatically improves if fiber and a low molecular weight compound partially substituted in the molecule with polar groups are simultaneously added to the plant-derived resin (Examples 11 to 21) compared with when fiber is added alone (Comparative Example 3) regardless of the added amount of the low molecular weight compound partially substituted in the molecule with polar groups. In addition, the moldability of the resin composition dramatically improves (Examples 11 to 21) compared with when a low molecular weight compound partially substituted in the molecule with polar groups is added alone (Reference Example 3 and Examples 5 and 22).

As shown in Examples 7, 12, 15 and 23 to 32, Comparative Examples 2 to 8 and Reference Example 5 shown in Tables 9 to 11, and in Examples 33 to 37, Comparative Examples 2 and 9 to 13 and Reference Example 5 shown in Tables 12 and 13, the heat resistance of a resin composition dramatically improves if fiber and a low molecular weight compound partially substituted in the molecule with polar groups are simultaneously added to the plant-derived resin (Examples 12 and 23 to 27 in Table 10, Examples 15 and 28 to 32 in Table 11 and Examples 33 to 37 in Table 13) compared with when fiber is added alone (Comparative Examples 3 to 8 in Table 9 and Comparative Examples 9 to 13 in Table 12) regardless of the added amount of fiber. In addition, the moldability of the resin composition dramatically improves (Examples 12 and 23 to 27 in Table 10, Examples 15 and 28 to 32 in Table 11 and Examples 33 to 37 in Table 13) compared with when a low molecular weight compound partially substituted in the molecule with polar groups is added alone (Reference Example 5 and Example 7).

As shown in Examples 38 to 42, Comparative Examples 2 and 14 to 18 shown in Tables 14 and 15, and in Examples 38 and 43 to 46 and Comparative Examples 14 and 19 to 22 shown in Tables 16 and 17, the heat resistance of a resin composition dramatically improves if fiber and a low molecular weight compound partially substituted in the molecule with polar groups are simultaneously added to the plant-derived resin (Examples 39 to 42 in Table 15 and Examples 43 to 46 in Table 17) compared with when fiber is added alone (Comparative Examples 15 to 18 in Table 14 and Comparative Examples 19 to 22 in Table 16), regardless of the added amount of fiber, even for a system in which an inorganic filler has been mixed into the plant-derived resin. In addition, the moldability of the resin composition dramatically improves (Examples 39 to 42 in Table 15 and Examples 43 to 46 in Table 17) compared with when a low molecular weight compound partially substituted in the molecule with polar groups is added alone (Example 38).

Industrial Applicability

The flame retardant thermoplastic resin composition according to the present invention can be processed into a molding for electrical and electronic equipment applications, building material applications, automobile part applications, daily-necessity applications, medical applications, agricultural applications, applications for toys and entertainment and the like, by methods such as injection molding, film molding, blow molding and foam molding.

The invention claimed is:

1. A thermoplastic resin composition, comprising:
   a plant-derived thermoplastic resin; and
   an organic crystal nucleating agent, wherein the organic crystal nucleating agent is hexamethylenebis-9,10-dihydroxystearic acid amide.

2. The thermoplastic resin composition according to claim 1, further comprising 1.0% to 40% by weight of a fiber, as a percentage by weight based on the total weight of the thermoplastic resin composition.

3. The thermoplastic resin composition according to claim 2, wherein the fiber is one or more selected from the group consisting of plant-derived fiber, synthetic organic fiber and inorganic fiber.

4. The thermoplastic resin composition according to claim 2, wherein the fiber has an average fiber length (number average fiber length excluding fragments) of 100 μm to 20 mm.

5. The thermoplastic resin composition according to claim 2, wherein the fiber includes a fiber having an average fiber length (number average fiber length excluding fragments) of 300 μm to 20 mm.

6. The thermoplastic resin composition according to claim 2, wherein the fiber has an average fiber length (number average fiber length excluding fragments) of 0.1 mm to 10 mm.

* * * * *